May 14, 1929.  C. E. JEFFERS  1,712,562
VEHICLE DOOR
Filed Feb. 18, 1927
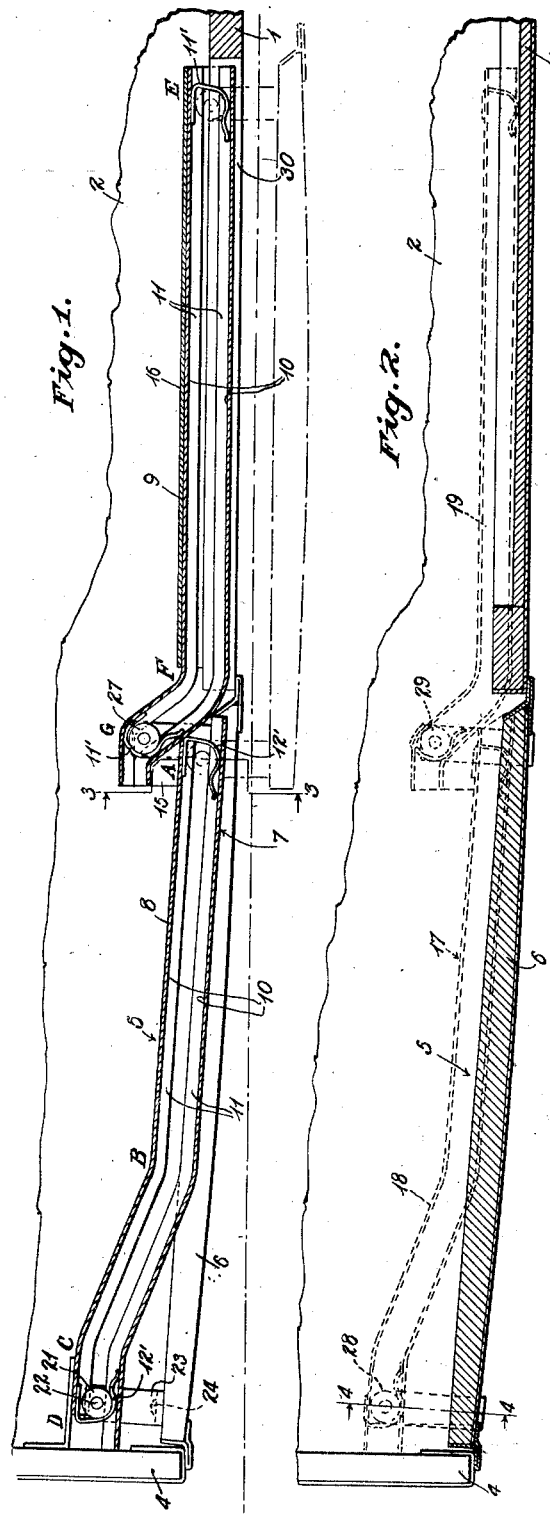
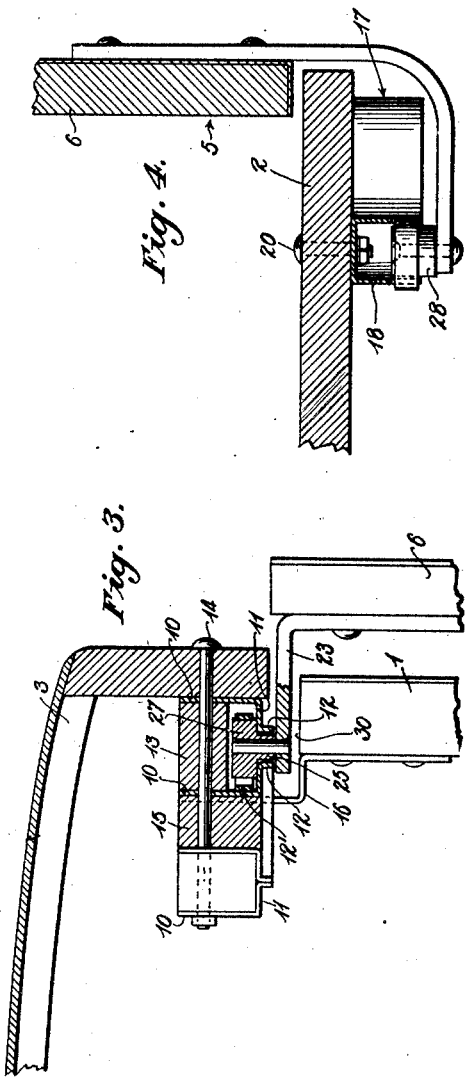
INVENTOR.
Clarence E. Jeffers
BY
ATTORNEYS Patented May 14, 1929.

1,712,562

UNITED STATES PATENT OFFICE.

CLARENCE E. JEFFERS, OF YORK, PENNSYLVANIA, ASSIGNOR TO MARTIN-PARRY CORPORATION, OF YORK, PENNSYLVANIA, A CORPORATION.

VEHICLE DOOR.

Application filed February 18, 1927. Serial No. 169,328.

The invention relates to improvements in doors for vehicle bodies of the commercial type.

It is an object of the invention to provide improved means for mounting a sliding door for controlling the door opening of a delivery body.

It is an object of the invention to provide a guiding and supporting means for such a sliding door which will cause the door when in a closed condition to lie flush with the side panel of the vehicle, but when in an open position to lie parallel therewith, with yieldable means for holding the door in either its open or closed position.

It is a further object of the invention to place the upper guides or supports for the door within the interior of the vehicle body so that no parts need project from the body substantially beyond the side panel thereof. With this conception in mind, the upper supporting guide is secured to the body near the top thereof and housed within the confines of the top while the supports for the door extend within the body and coact with said guides.

The invention further comprehends a novel form of door supporting guide and its manner of mounting to the vehicle body.

In the drawings,

Fig. 1 is a longitudinal sectional view showing the trackage arrangement mounted on the vehicle, Fig. 2 is a longitudinal sectional view showing the door in its closed position and the arrangement of the lower trackage system, Fig. 3 is a detailed view partly in section showing the structure of the upper track, and Fig. 4 is a detailed view showing the lower track arrangement.

Referring now more particularly to the drawings, wherein like reference characters indicate corresponding parts, the numeral 1 designates the side panel of a vehicle body having a bottom 2 and a top 3. This body likewise is provided with a windshield post 4 at its forward end positioned immediately in advance of the driver's seat. A suitable door opening 5 is provided to permit the driver to enter or leave the seat.

For controlling this door opening, a sliding door 6 is shown. This invention comprehends novel means for mounting the door so that when it is in a closed position, as shown in Fig. 2, it lies flush with the panel 1 and the windshield post 4 while, upon the opening of the door, it is swung out of alignment with the panel 1, and when in an open position, is offset with respect to the panel as shown in Fig. 1.

To support the door and to cause it to shift inwardly and outwardly in lateral planes during the sliding movement thereof, I provide an upper track 7 comprising the front and rear portions 8 and 9. Each portion of the track consists of a pair of metallic angle members 10 having supporting surfaces 11 and down-turned guiding flanges 12. These sections are spaced apart by filler blocks 13 which are secured in position by fastening bolts 14 passing through a portion of the side panel 1, the members 10 and 11, the block 15, and a metallic protecting cover 16. This construction causes the track portions to be firmly held in position within the body.

The front track portion 8 from the point A to the point B extends substantially in a straight line, but beginning at the point B, the members forming this track portion are bent inwardly at a substantial angle to the point C and continue in substantially a straight line from the point C to the point D.

The rear portion 9 of the top track also for its major length, that is, from the point E to the point F, extends in a straight line, and from the point F to the point G extends abruptly inwardly at a substantially greater angle than the angle of the front track 8 from the point B to the point C. The rear track portion at its front and rear ends carries a spring clip 11', while the front track portion is provided with similar clips 12', at the forward and rear ends thereof for purposes that will hereinafter appear.

The bottom of the vehicle body is also provided with a track-way or system 17 having a forward portion 18 and a rear portion 19. This track-way is the same in contour as the track-way 8. It further lies in vertical alignment with the track-way 8. However, the lower track-way is preferably constructed from a single stamping of metal 19, bolted to the rear of the floor by the bolts 20.

The sliding door 6 carries a front supporting roller 21 mounted on the stem 22, which stem is in turn connected with the supporting angle 23, bolted to the forward end of the door 6 by the bolts 24. The roller 21 has an enlarged head, and a reduced neck 25 which fits between the depending guides of the track 8.

The rear end of the door 6 along its upper surface has a smaller supporting roller 27. Inasmuch as this roller is of the same construction as the roller 21, a detailed description is not necessary. However, it is to be observed that this roller 27 engages and o-operates with the portion 9 of the track-way 7, while the front roller 21 cooperates with the forward portion 8 of the track-way 7.

The bottom of the door is likewise retained in position and guided by a pair of rollers, one being represented by the reference character 28, and the other by the reference character 29. As is the case with the upper rollers, one of such rollers engages the portion 18 of the track 17, while the other roller engages the portion 19 thereof.

As shown in Fig. 3, the rear roller 27 is mounted on the arm 23 of the supporting angle, and this arm extends from the slot 30 in the side panel so that the rear track portion 9 may be housed within the body so that no overhanging or protecting parts are necessary. It will also be appreciated that the front portion 8 of the track 7 is adequately supported from the upper portion of the body in a manner substantially the same as shown in Fig. 3.

Assuming that the door is closed, as shown in its full line position in Fig. 1, to open the same the resistance of the springs 11' and 12' must be overcome. When this occurs, the initial rearward movement of the door causes the rear end of the door to move outwardly in a lateral plane by reason of the roller 27 riding between the reference characters G and F between the rear portion 9 of the guideway 7, this movement serving, of course, to throw the rear end of the door out of alignment with the panel. The movement imparted to the rear end of the door is a rather abrupt one, whereas, upon the initial movement of the door, its forward end is gradually shifted outwardly in a lateral plane by reason of the front roller 21 riding in that section of the front portion of the guideway between the reference characters C and B. When the door has been shifted laterally so that it is out of alignment with the panel way, it is then moved rearwardly to the position shown in dotted lines, Fig. 1, in which position it is parallel with the panel 1.

To close the door, the same is moved forwardly against the resistance of the springs 11' and 12', and during its forward movement it advances in a plane parallel with the panel of the door until the front roller 21 enters that part of the front portion 8 of the track-way 7 defined by the reference characters C and B, whereupon the forward end of the door progressively moves inwardly until it reaches the point indicated by the reference character C, after which a continued forward movement causes the rear end of the door to be abruptly thrown inwardly by reason of the roller 27 riding in the section of the passageway defined by the reference characters F and G. When in this position, the rear end of the door is in alignment with the panel 1, while the front end of the door is positioned behind the windshield post 4. No portions of the door project outwardly beyond the plane of the body so that the body presents in its entirety a most pleasing appearance.

It will be understood that the lower supporting and guide rollers 28 and 29 of the door shift the lower end of the door in directly the same manner as the upper end thereof is shifted by the upper rollers 21 and 27, so that the door during its sliding movement is also positively moved inwardly and outwardly, the direction of this movement depending upon whether the door is being opened or closed.

It will also be apparent that the guiding tracks for the door are located within the vehicle body so that the top nor no part of the body need project substantially beyond the panel to house such tracks.

Having thus described the invention, what I claim is:

1. The combination with a motor vehicle body having a side panel and a door opening at the forward end of the body, a door for said opening, means for mounting said door for horizontal movement disposed within the confines of the body, door supporting devices carried by the door and engaging said means, the panel having an elongated slot therein, a connecting arm securing one of said door supporting devices with the door and passing through said slot, said door on a sliding movement as it approaches a closed position being shifted laterally to bring the edges thereof flush with the panel when the door is closed, and upon its initial sliding opening movement to shift the door laterally to offset the same with respect to the panel.

2. The combination with a motor vehicle body having a side panel and a door opening therein, a door for said opening, upper and lower track systems for supporting said door for a sliding movement, the upper track system being housed within the body with a portion thereof extending parallel with the panel, said panel having a longitudinal slot therein, a plurality of door supporting devices carried by the door and cooperating with said track systems, means connecting one of said devices with the door extending through a longitudinal slot in the panel, said track systems serving on the initial opening movement of the door to shift the same laterally to offset the door relative to the panel, and when the door is approaching its closed position to shift the said door inwardly whereby it lies in alignment with the panel when in a closed position.

3. The combination with a vehicle body having a side panel, a door opening therefor, a sliding door for said opening, supporting elements for the front and rear side of the door, a track system with which said supporting elements cooperate disposed within the body, an elongated slot in said panel through which the rear supporting element passes to engage said track system, said door upon a closing movement being progressively shifted inwardly to lie flush with the panel, and upon its initial opening movement to be shifted outwardly laterally relative to the panel.

4. A vehicle body having a side panel and a door opening, a sliding door for said opening, supporting tracks disposed within said body, said panel having a parallel slot coextensive with a portion of said track, supporting devices connected with the door, track engaging elements carried by said devices, one of said devices being adapted to pass through the slot in the panel during a portion of the sliding movement of said door.

5. A vehicle body having a sliding and laterally shifting door, a track for said door composed of a plurality of angular plates spaced apart to provide relatively flat supporting surfaces and vertical guides, guiding devices connected with said door, said guiding devices each having a part cooperating with said supporting surfaces of said track, and a reduced portion cooperating with the vertical guides thereof to prevent undue lateral movement of the door, and spring catches located within the track for engaging the guiding devices for maintaining the door in either its full open or closed position.

6. The combination with a motor vehicle body having a side panel and a door opening at the forward end of the body, a door for said opening, a track for mounting said door for horizontal movement disposed within the confines of the body, door supporting devices carried by the door and engaging said track, the panel having an elongated slot therein, a connecting arm securing one of the door supporting devices with the door and passing through said slot, spring catches located within said track and stationary with respect thereto for engaging the door supporting devices when the door is moved to either full or closed position to thereby prevent accidental sliding movement of the door.

7. The combination with a motor vehicle having a side panel, a windshield post and a door opening at the forward end of the body, a door for said body, a track for mounting said door for horizontal movement, door supporting devices carried by the door and engaging said track, said track having portions of differential curvature to progressively move the door inwardly in a gradual manner upon a forward movement thereof toward the windshield post and to thereafter abruptly move the rear end of the door inwardly to a position where the exterior surfaces of the door is substantially flush with the rear panel of the body and the windshield post respectively, the spring catches located within the track at the opposite extremities thereof and stationarily disposed with respect thereto for yieldably engaging the door supporting devices upon either of the extreme movements of the door to thereby permit accidental displacement of the door.

In testimony whereof I affix my signature.

CLARENCE E. JEFFERS.